J. C. MARKS.
FLOWER POT.
APPLICATION FILED DEC. 16, 1916.

1,251,552.

Patented Jan. 1, 1918.

Witness
G. T. Bakl.
E. L. Greenewald

Inventor
John C. Marks
By Foster Freeman Watson & Coit
Attorney

UNITED STATES PATENT OFFICE.

JOHN C. MARKS, OF CHICAGO, ILLINOIS.

FLOWER-POT.

1,251,552.    Specification of Letters Patent.    Patented Jan. 1, 1918.

Application filed December 16, 1916. Serial No. 137,391.

*To all whom it may concern:*

Be it known that I, JOHN C. MARKS, a citizen of the United States, and resident of Chicago, Cook county, State of Illinois, have invented certain new and useful Improvements in Flower-Pots, of which the following is a specification.

This invention relates to earthenware flower pots.

One of the objects of the invention is to provide a removable false bottom for the pot which is adapted to support soil above the true bottom of the flower pot and provide a space beneath it for water and air. Another object of the invention is to provide a removable bottom for the pot which may be reversed and used as a small flower pot for starting plants.

Still another object of the invention is to provide two horizontal spaced shoulders on the outside of the pot near the bottom to serve as indicating marks to show the level of the water in the pot and also to indicate whether the projection on the under side of the false bottom is in or out of the water.

Figure 1:
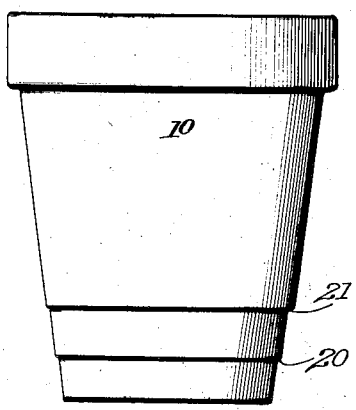
Figure 2:
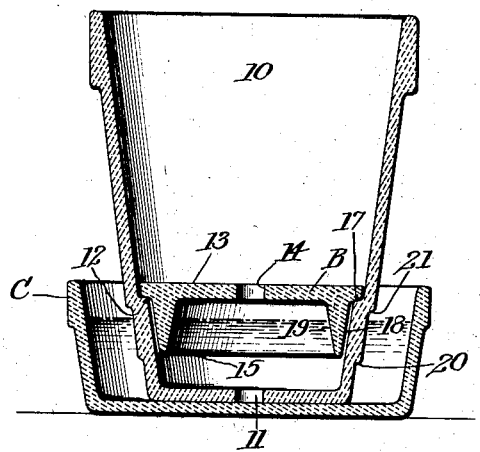
Figure 3:
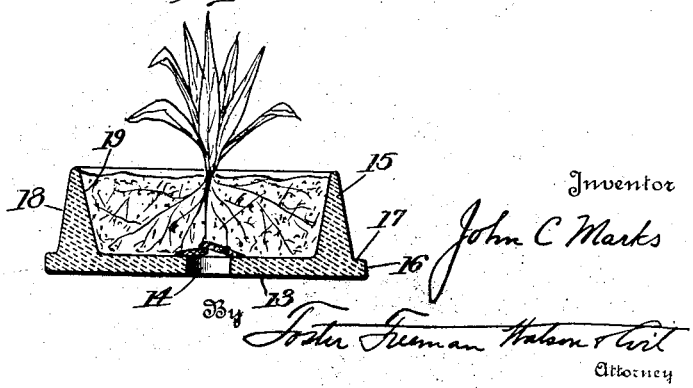

The above and other objects and the novel features of the invention will be apparent from the following description taken in connection with the drawings, which form a part of the present specification and in which, Figure 1 is a side elevation of a flower pot embodying the invention;

Fig. 2 is a vertical sectional view of a flower pot embodying the invention, showing the same set in a pan or saucer for containing water, and Fig. 3 is a sectional view of the false bottom inverted and in use as a small flower pot for starting plants.

Referring to the drawings, 10 designates the body of a flower pot of the usual frusto-conical shape, made of any suitable material but preferably of clay and having in its bottom the usual drainage opening 11. On its inner surface and about one-third of the way from the bottom of the pot to the top is formed an annular shoulder 12 which constitutes a supporting ledge for the false bottom B.

The false bottom B consists of a body made of a clay mixture and sawdust or the like, the sawdust being burned out when the body is fired making it more porous and a better conductor of moisture.

The upper face 13 of the false bottom B is substantially flat and forms the soil supporting surface. The false bottom B is provided with a central drainage passage 14 which facilitates free drainage from the soil supported on the false bottom and also permits air to reach the roots of the plants from the air space below the false bottom. The under side of the false bottom is provided with an integral imperforate annular flange 15 which is located a slight distance within the marginal edge 16 of the false bottom to leave a surface 17 between said edge and the flange 15 to engage the supporting shoulder 12. The outer surface 18 of the flange 15 tapers downwardly in conformity with the adjacent inner surface of the flower pot. The inner surface 19 of the flange 15 tapers downwardly and outwardly to the lower edge of the flange 15 so that the false bottom will be cup-shaped to adapt it, when inverted, for use as a small pot for starting plants, as shown in Fig. 3. When used for the latter purpose the face 13 of the false bottom serves as a bottom face and the flange 15 constitutes the side wall of the small pot.

In Fig. 2 the pot is shown set in a saucer or water container C. In order to regulate the depth of the water and to be able to tell at a glance whether the flange 15 is dipping in the water or not I have provided two vertically spaced horizontal shoulders 20 and 21 on the outside of the pot near the bottom thereof. These shoulders are formed when the pot is made and the shoulder 20 constitutes the low water level and the shoulder 21 constitutes the high water level. The shoulders 20 and 21 are respectively below and above the lower end of the tapering flange 15. For a plant which does not require much water only the walls of the pot will be used to conduct the water to the plant and the water level will therefore be kept no higher than the shoulder 20 so that the flange 15 will not extend into the water. For a plant which requires a large quantity of water the water level will be kept well above the shoulder 20 and in some cases as high as the shoulder 21, the high water level 21 being the upper limit so as to prevent completely closing the air space below the false bottom. Since the flange tapers downwardly, the higher the water level is the more surface of the flange will be exposed to the pores of the false bottom whereby a greater quantity will rise by capillary action through the false bottom. Since the flange 15 is wide at its upper attached end and is located between the edge 16 and the center opening 14, it will serve to distribute water to all parts of the soil on the upper side of the false bottom.

While I have shown and described my invention in detail it is to be understood that various changes may be made therein without departing from the spirit of the invention and therefore I do not wish to be limited to the exact construction shown.

Having thus described the invention what is claimed and desired to be secured by Letters Patent is:

1. The combination with a flower pot, of a porous false bottom therein having a soil-supporting surface on its upper side and a projection on its under side adapted to feed water to the soil by capillary action, said flower pot having two vertically spaced marks on the outside wall thereof, said marks being respectively above and below the lower end of said projection to serve as means for indicating the water level in the pot and also the relation of the water level to the lower end of the projection on the false bottom.

2. The combination with a flower pot having an opening in its true bottom and an interior shoulder above said bottom, of a porous false bottom supported on said shoulder, said false bottom having a soil-supporting surface on its upper side and an integral projection on its under side terminating above the true bottom of the pot and adapted to feed water to the soil by capillary action, said flower pot having two vertically spaced horizontal shoulders on the outside wall thereof, said shoulders being respectively above and below the lower end of said projection to serve as means for indicating the water level in the pot and also for indicating the relation of the water level to the lower end of the projection on the false bottom.

3. A new article of manufacture comprising a false bottom for flower pots consisting of a body of porous material adapted to fit into a flower pot of the usual tapering form and having a substantially flat upper soil supporting surface and an annular imperforate flange on its lower side, said flange being of sufficient depth to form the sides of a plant starting pot and said false bottom being adapted and designed to be inverted and used as a small pot for starting plants, in which use the annular flange constitutes the side wall and said soil-supporting surface the bottom face of the small pot.

4. The combination with a flower pot having an internal shoulder to support a false bottom and a false bottom adapted to rest on said shoulder and having an integral porous projection extending downwardly but having its lowest extremity above the bottom of the flower pot, said flower pot having marks on its outer side to indicate substantially the levels of the top and bottom of said integral porous projection, whereby the amount of immersion of said projection may be regulated.

5. The combination of a flower pot having the usual perforation in its bottom, an internal shoulder above the bottom and an external water indicating mark below said shoulder, of a saucer or receptacle adapted to receive the flower pot and to hold water up to the level of said mark and a false bottom of porous material adapted to rest on said shoulder and having an integral porous flange extending downward below said external water mark and adapted to conduct water by capillary action to soil resting upon said false bottom, substantially as described.

In testimony whereof I affix my signature.

JOHN C. MARKS.